United States Patent [19]

Hegemann et al.

[11] 4,052,042

[45] Oct. 4, 1977

[54] APPARATUS FOR CLEANING BLAST-FURNACE EXHAUST GASES

[75] Inventors: Karl-Rüdolf Hegemann, Essen-Bergerhausen; Günther Finger, Wesel; Albert Brinkmann, Duisburg; Helmut Weissert, Hamm, all of Germany

[73] Assignee: Gottfried Bischoff Bau kompl. Gasreiningungs-und Wasserruckkuhlungs-Anlagen Kommanditengesellschaft, Essen, Germany

[21] Appl. No.: 688,893

[22] Filed: May 21, 1976

[30] Foreign Application Priority Data

May 24, 1975 Germany .......................... 2523083
May 24, 1975 Germany .......................... 2523082

[51] Int. Cl.² .......................................... C21B 7/22
[52] U.S. Cl. .......................................... 266/89; 266/159; 55/21; 55/213; 55/226; 55/385 D; 261/DIG. 56
[58] Field of Search .................. 55/21, 93, 94, 210, 55/213, 223, 226, 238, 257 R, 258, 385 R, 385 D, 418; 261/23 R, 62, DIG. 54, DIG. 56; 266/159, 147, 157, 44, 89; 60/39.09 D, 39.05, 39.5, 39.59

[56] References Cited

U.S. PATENT DOCUMENTS

| | | | |
|---|---|---|---|
| 3,041,059 | 6/1962 | Powell | 266/147 |
| 3,045,996 | 7/1962 | Rice | 266/147 |
| 3,726,065 | 4/1973 | Hausberg et al. | 55/223 |
| 3,820,307 | 6/1974 | Hausberg et al. | 55/226 |
| 3,854,300 | 12/1974 | Cerhold | 55/84 |
| 3,976,454 | 8/1976 | Hausberg et al. | 55/226 |

*Primary Examiner*—Frank W. Lutter
*Assistant Examiner*—David L. Lacey
*Attorney, Agent, or Firm*—Karl F. Ross

[57] ABSTRACT

An apparatus for cleaning the exhaust gas of a high-pressure blast furnace comprises a coarse-particle separator, a prewasher and a differential-pressure annular gap washer traversed in succession by the gases. The exhaust gases can be passed through a main duct provided with an expansion turbine or through a bypass duct around the expansion turbine. The expansion turbine unit controls the back pressure at the blast furnace while a separate control circuit is provided to operate the differential-pressure washer with optimum efficiency. A quick-closing valve in the turbine-supply line and a quick-opening valve in the bypass line permits rapid switchover, a pressure-control valve in the bypass line maintains a constant backpressure at the blast furnace when the expansion turbine unit is shut down.

19 Claims, 3 Drawing Figures

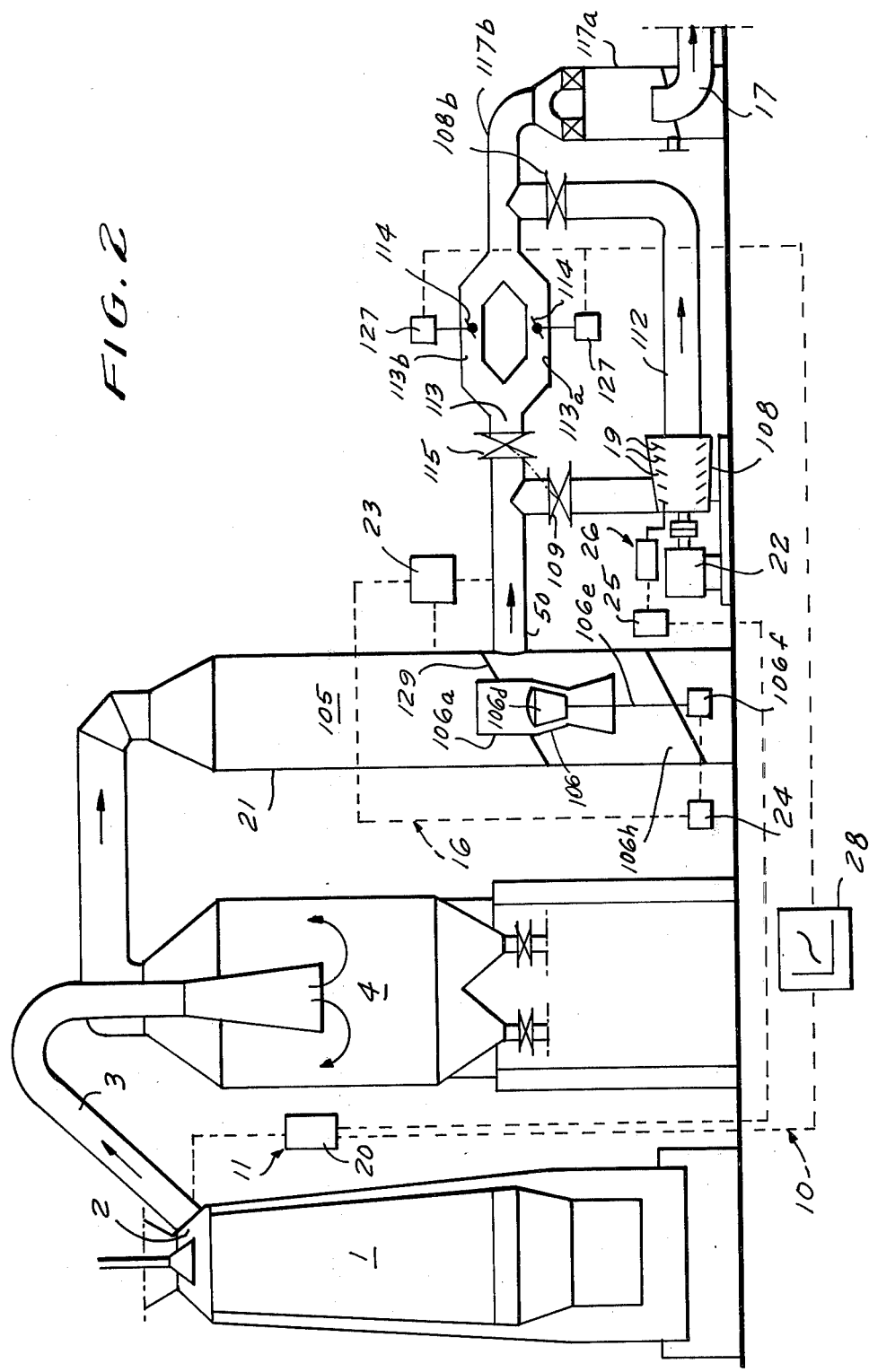

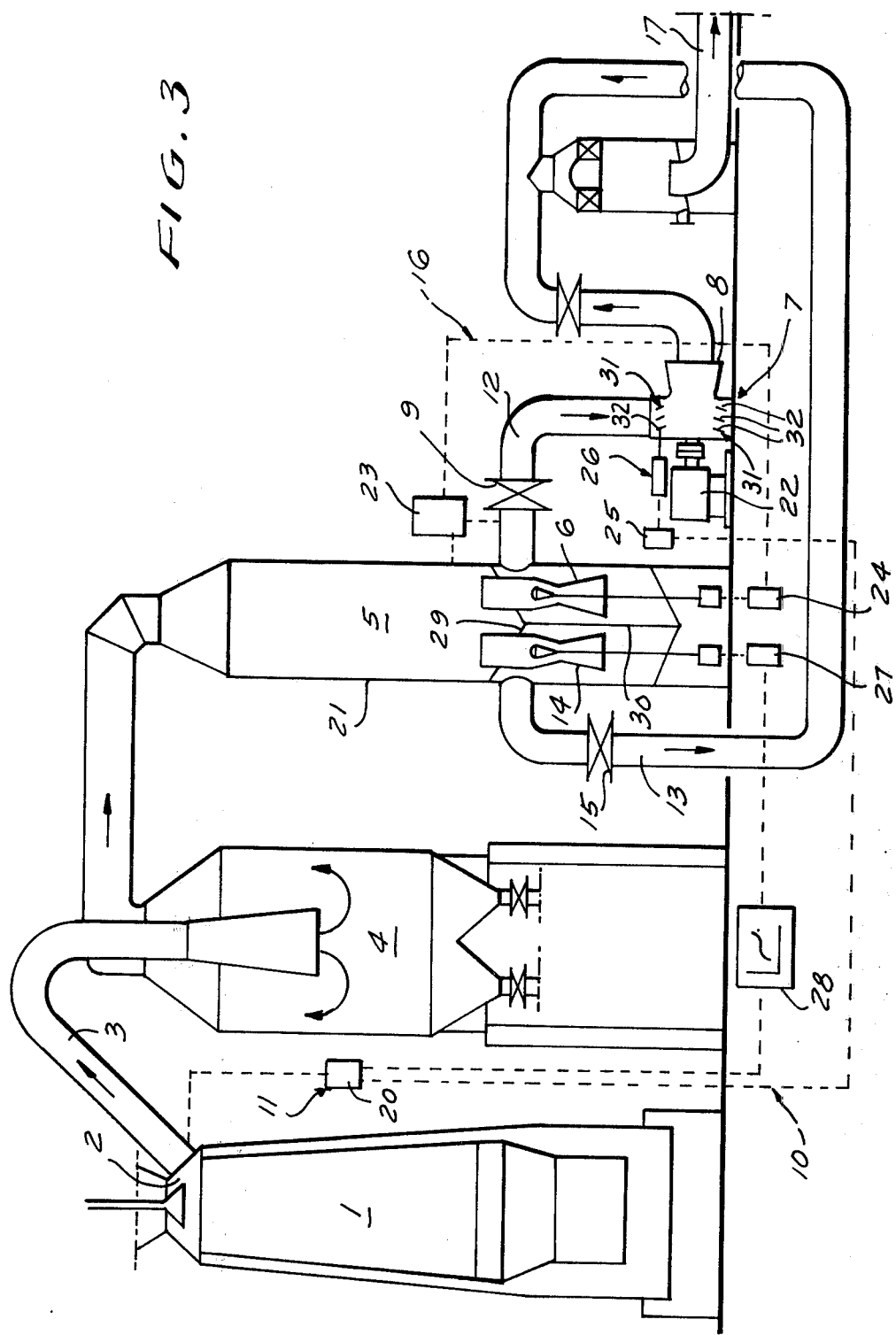

APPARATUS FOR CLEANING BLAST-FURNACE EXHAUST GASES

CROSS-REFERENCE TO RELATED APPLICATIONS

This application is related to commonly assigned copending applications Ser. No. 520,920 filed Nov. 4, 1974 (U.S. Pat. No. 4,007,025) and Ser. No. 670,542 filed Mar. 25, 1976 which, in turn, refers to commonly assigned copending application Ser. No. 551,052 filed February 19 1975 (U.S. Pat. No. 3,976,454) and to U.S. Pat. Nos. 3,726,085, 3,855,744, 3,844,745 and 3,854,908.

FIELD OF THE INVENTION

The present invention relates to an exhaust-gas cleaning installation fo a high-pressure blast furnace and, more particularly, to improvements in blast-furnace gas-cleaning apparatus which extend the principles set forth in the earlier work mentioned above.

BACKGROUND OF THE INVENTION

It is known from the state of the art, evident in the issued patents enumerated above, that the exhaust gases of a high-pressure blast furnace can be cleaned by passing the exhaust gases in succession through a coarse-particle separator, a prewashing column and a differential-pressure washer, the gas/water mixture being accelerated through an annular gap in the latter washer and expanded downstream thereof to effect an intimate contact between the gas and the water, thereby leading to high-efficiency washing of the gas. The annular-gap washer or differential-pressure washer generally comprises a tubular passage formed with a constriction in which a body is displaceable, thereby defining an annular gap traversed by the water-laden gas stream. The width of this gap can be adjusted by shifting the body axially within the passage, thereby varying the pressure differential across this washer.

In improvements over the state of the art developed by us and our coworkers, an expansion turbine unit is provided downstream of the differential-pressure washer to convert the kinetic energy and potential energy of the scrubbed gas into useful work, e.g. the generation of electrical energy.

It is possible in such a system to control the pressure at the gas outlet or head of a high-pressure blast furnace by an appropriate control circuit having a sensor responsive to this pressure and a controller with a positioning member which varies the flow cross-section along the path of the gas to maintain a substantially constant backpressure at the blast furnace.

We have found that it is possible to provide the differential-pressure washer as the exclusive control element for the control circuit which maintains the exhaust-gas pressure at the head of the high-pressure blast furnace constant. For example, the differential-pressure washer can comprise two differential-pressure washing units, one of which is provided directly upstream of the expansion turbine unit while the other is provided in series with the first. The differential-pressure washers are then provided with a bypass duct which branches from the main stream beyond the differential-pressure washer and is connected to a pure gas discharge duct. The bypass can be provided with a control valve and with the expansion turbine.

This arrangement has the advantage that for the highest pressures at the head of the furnace, the expansion turbine is effective for bypass control of the pressure and thus is driven to convert part of the gas energy to useful work. At the lower pressures the use of the bypass is reduced by the control valve.

The expansion turbine could, of course, have a quick-closing valve as is conventional in turbine installations and as described below.

It was found that the aforedescribed system, using an annular-gap washer, was highly advantageous since it allowed the exhaust-gas pressure at the head of the high-pressure blast furnace to be maintained without difficulty when the quick-closing valve of the expansion turbine was closed. The turbine unit could be used to maintain the gas pressure more or less constant at least within certain limits and an effective combination of maximum energy recovery and gas cleaning was obtained.

However, experience with our earlier system has demonstrated that it is not always completely satisfactory when control of both the backpressure at the head of the high-pressure blast furnace and optimum differential-pressure washing is desired. This can be understood in terms of the requirements for differential-pressure washing and backpressure control. For optimum differential-pressure washing, it is desirable to maintain the pressure differential across the annular gap of the washer substantially constant in spite of fluctuations in volume rate of flow of the gases and the instantaneous pressures ahead of or behind the gap.

For control of the gas pressure at the head of the highpressure blast furnace, however, it may be necessary to discharge (vent) sharply larger volumes of gas from the blast furnace to prevent an excessively high pressure from developing or to reduce the volume rate of flow of the gas below the optimum flow to achieve the aforementioned pressure differential at the differential-pressure washer. Accordingly, even with the earlier system, which represented a major advance in the art, we were not able to fully achieve all of the desiderata for optimum regulation of blast-furnace backpressure and optimum operation of the differential-pressure washer.

OBJECTS OF THE INVENTION

It is the principal object of the present invention to provide an improved apparatus for the cleaning of gas of a high-pressure blast furnace which will extend the principles set forth in our earlier work as described above and permit both control of the pressure at the blast-furnace head and optimum operation of the differential-pressure washer.

In other words, the object of the invention is to provide a gas-cleaning plant for the above-described purposes which enables pressure control of the exhaust gases at the head of the furnace and operation of the differential-pressure washer to be decoupled from one another in the control sense in spite of the interdependence of the flow of gas from the blast furnace and the flow of gas through the differential washer.

SUMMARY OF THE INVENTION

This object is attained, in accordance with the present invention, by feeding the gas from the furnace through a main duct through the differential-washer unit and the expansion-turbine unit and branching a bypass duct around the expansion-turbine unit, the bypass duct being provided with a pressure-control valve and a quick-closing valve.

According to the invention, the expansion turbine unit is used as the control element in a control circuit for the pressure at the head of the high-pressure blast furnace, i.e. is integrated into the control circuit for the pressure at the head of the blast furnace, while the pressure-control valve in the bypass duct is included in this control circuit or in an equivalent control circuit so as to be operated in response to the pressure control circuit for the blast-furnace backpressure. The expansion turbine unit is provided with a quick-closing valve which is so associated with a quick-opening valve of the bypass duct that, upon closing of the quick-closing valve, the quick-opening valve in the bypass line is opened.

According to an important feature of the invention, a separate control circuit is provided for the diferential-pressure washer which is located upstream of the expansion turbine, the latter control circuit responding to the pressure differential across the annular gap of this washer and having as its control element the movable body disposed in the constriction of this washer.

In the description below, use is made of certain control terminology which should be briefly reviewed at this point.

Actual-value sensors or detectors are used to detect the pressure in the head of the high-pressure blast furnace or at locations ahead of and beyond the annular gap of the differential-pressure washer. These sensors or detectors provide outputs to a controller which may have a set-point input enabling the desired or set-point pressure at the head of the blast furnace or the desired pressure differential to be compared with the actual values fed to the controller from the sensors or detectors. The output of the controller is, in each case, a control signal which may be electrical, mechanical, pneumatic, hydraulic, the displacement of a rod or other element or the like to operate a control member which regulates a device to reduce the error signal and restore the actual value to the set-point value. The inputs to the controller may be mechanical, electrical etc., and the control member is usually a servomotor or position controller which can operate, for example, a valve of a fluid cylinder, the control member for the vanes of an array of louvers, or the control elements for the movable blades of a turbine. The controller may be a differential-pressure controller as described above or a simple proportional-pressure controller.

Pressure-responsive detectors or sensors of this type are described at Chapter 22 of PERRY'S CHEMICAL ENGINEERS' HANDBOOK, McGraw-Hill Book Co., New York, 1963. The controllers may be mechanical or electronic (pages 22, 60-83, op.cit.) and the control members may be servomechanisms of the type described at pages 277-314 and 390 ff. of SERVO-MECHANISM PRACTICE, McGraw Hill Book Co., New York, 1960. Function generators may be used as described below (see INTRODUCTION SYSTEMS ANALYSIS, McGraw-HILL Book Co., New York, 1961).

According to a feature of the invention, the expansion turbine unit can be provided with control means for regulating the gas throughput. For example, the expansion turbine can be of the adjustable-vane or adjustable-plate type whereupon the control member can be the system for adjusting the vanes or blades of the turbine. Alternatively, ahead of the intake to the turbine or the turbine chamber, a louver arrangement can be provided, the positions of the louvers being adjustable. In this case the adjustable. louvers constitute the control member in the control circuit for the pressure at the head of the blast furnace. Another type of control member can be a variable-cross section valve at the intake to the turbine.

According to another feature of the invention, the pressure-control valve in the bypass duct can be constituted as a differential-pressure washer with a movable body of the aforementioned type defining a variable annular gap.

The bypass duct preferably branches from the main path of the gases downstream of the prewashing step. Of course, it is possible within the scope of the present invention to branch the bypass duct downstream of the differential-pressure washing unit as well. In either case the advantages of the present system alluded to earlier are obtained, namely, the operation of the differential-pressure washer with optimum parameters without concern for the pressure control at the head or gas outlet of the high-pressure blast furnace.

The differential-pressure washing can thus be effected either in the bypass duct in the case where the bypass duct communicates with the prewasher ahead of the main differential-pressure washer, or in the main differential-pressure washer in the case where branching of the bypass duct is downstream therefrom. Effective washing of the gas stream is obtained in either case.

In general, we have found it to be advantageous to provide the one or more differential-pressure washers, whether in the main duct or in the bypass duct, as annular-gap washers of the aforedescribed type and for each such duct we can use either a single annular-gap washer or a plurality of parallel positioned and operated annular-gap washers.

The invention is based upon our discovery that in a gas-cleaning installation of the aforedescribed type no control problems arise for regulating the pressure at the outlet or head of the high-pressure blast furnace with the substantially instantaneous closing of the quick-closing valve of the expansion turbine and simultaneous instantaneous opening of the quick-opening valve of the bypass duct.

The quick-closing valve of the expansion turbine has the function assigned to it in conventional turbine installations, namely, that of blocking when a dangerous situation arises, in the sense that the turbine is driven too fast to be able to sustain the speed, or to nullify the effect of a sudden change in pressure (shockwave) or the like. Furthermore, it may be desirable to cut out the turbine when it can no longer effectively control backpressure at the blast furnace, i.e. when a sudden change in the pressure at the blast furnace indicates that the turbine adjustment is no longer capable of controlling the backpressure. With the system of the present invention the quick-opening valve of the by pass line opens simultaneously with the closure of the quick-closing valve and thereby permits the pressure-control valve of the bypass line to take over control of backpressure automatically and instantaneously.

The expansion turbine is, according to the preferred embodiment of the invention, a centripetal turbine with a centrifugal sifter (screen classifier) housing. When two differential-pressure washing arrangements are provided, as is the case where one of them forms the pressure-regulating valve of the bypass duct, it has been found to be advantageous to mount them in a common washing tower which serves as the prewasher, the differential-pressure washers being separated from the prewasher and from each other by appropriate partitions.

BRIEF DESCRIPTION OF THE DRAWING

The above and other objects, features and advantages of the present invention will become more readily apparent from the following description, reference being made to the accompanying drawing in which:

FIG. 2 is a diagrammatic illustration of another embodiment of the invention; and FIG. 3 is a similar view which shows a modification of the system of FIG. 1.

SPECIFIC DESCRIPTION

Figure 1:
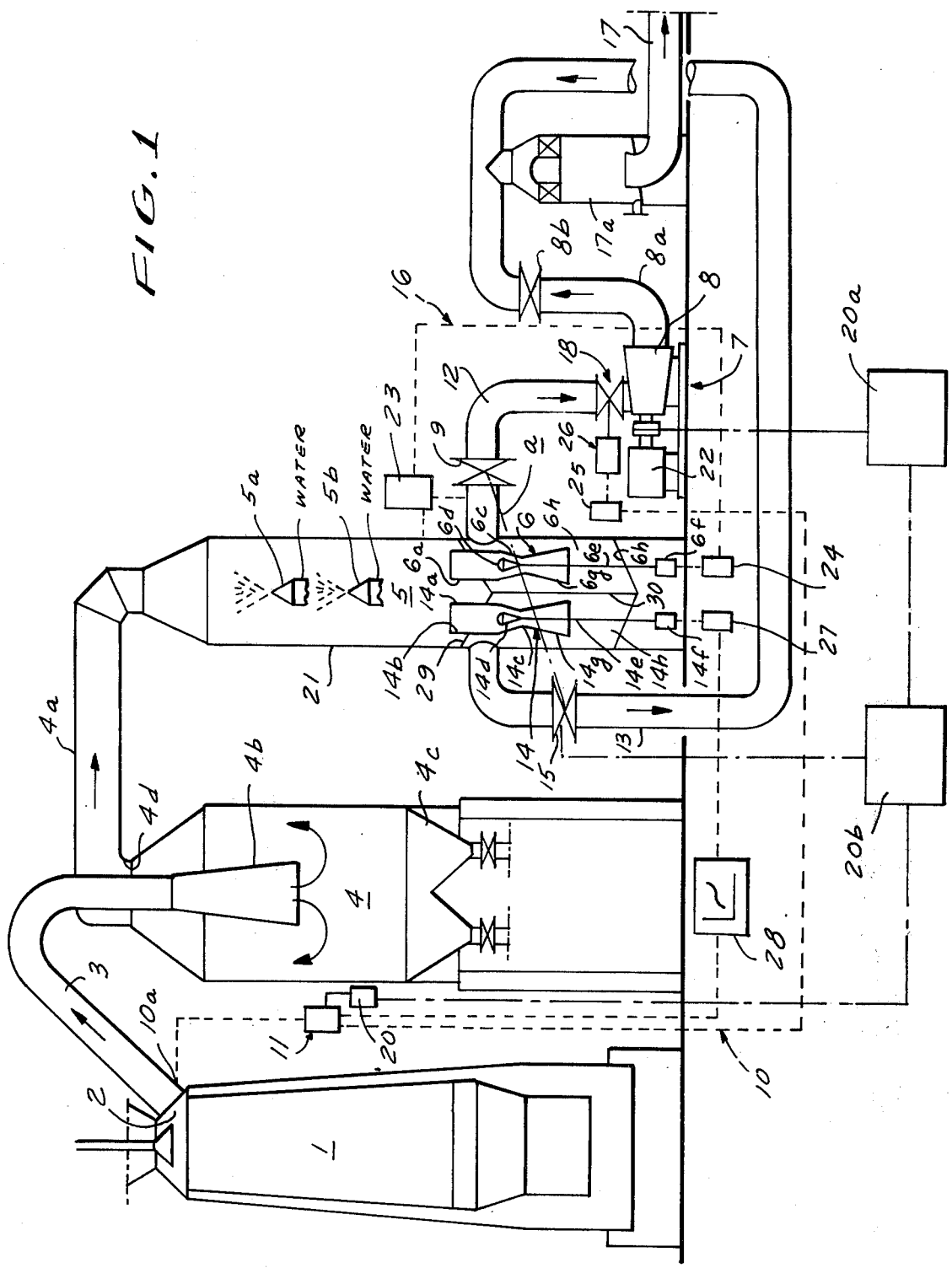
FIG. 1 is a flow diagram of a gas-cleaning installation for a high-pressure blast furnace having a differential-pressure washing unit ahead of an expansion-turbine unit and provided with a bypass duct according to the invention.

In the drawing the various elements of the apparatus have been shown schematically with certain parts illustrated as if they were in vertical section and the walls of various ducts and housing structures are represented as single lines to maintain proper proportion.

In FIG. 1 we have shown a system for cleaning the gas of a blast furnace 1 whose gas-discharge head 2 is provided with a duct 3 opening into a coarse-particle separator 4 connected by a further duct 4a to a prewasher unit 5. Downstream of the prewasher unit there is provided a differential-pressure washing unit 6 which is followed by an expansion turbine unit 7.

The expansion turbine unit 7 comprises an expansion turbine 8 with associated valves, including a rapid-closing valve 9.

A control circuit is represented generally at 10 and has its detector input 10a feeding a pressure valve (actual-valve signal) to a controller 11 as will be described in greater detail hereinafter.

The coarse-particle separator 4 may be of the cyclone or direction-change type and can be provided with a downwardly diverging inlet 4b whose progressively increasing cross section causes a velocity reduction in the gas, a bin 4c in which particles continuing to pass downwardly by inertia are collected and a central outlet 4d at the upper end of the coarse-particle separator which is connected to the duct 4a mentioned previously.

The prewasher 5 may comprise a vertically elongated upright housing 21 provided with upwardly directed spray nozzles 5a and 5b which spray water upwardly into the downwardly moving stream of gas. The differential-pressure washer of the unit 6 may also be equipped with spray nozzles (not shown) as described in U.S. Pat. No. 3,726,065 to serve as an annular-gap washer.

As can be seen from FIG. 1, the crude gas from duct 3, after passing through the prewasher 5 can pass into either of two streams, one of which is formed by the main duct 12 and passes through the expansion turbine unit 7 while the other is formed by a bypass duct 13.

Duct 13 is provided with a rapid-opening valve 15 is series with a pressure-control valve which is formed by the annular gap washer 14 mounted in the partition 299 spanning the column 21 in parallel with the differential-pressure washer 6. For convenience of description, therefore, unit 14 will be referred to as a pressure-control valve although it simultaneously forms an annular-gap differential-pressure washer.

The pressure-control valve 14 thus can comprise a tubular body 14a provided with a cylindrical upper portion 14b which converges at an intermediate location toward a constriction 14c in which a conical body 14d is disposed. The body 14d is capable of being moved vertically on a rod 14e by, for example, a fluid-responsive device 14f such as a hydraulic or pneumatic cylinder, under the control of a servomotor 27 forming part of the control circuit. The valve 14 is thus integrated as the control member into circuit 10 to regulate the backpressure of the blast furnace 1 when the bypass duct is effective.

Below the constriction 14c, the tubular body 14a diverges downwardly to form a LAVAL-type nozzle 14g. Thus, when body 14d is lowered in the constriction 14c it can block the latteer and in raised positions, by vruing the flow cross-section of the gap, can regulate the pressure upstream thereof. The nozzle 14g opens into a compartment 14h separated fro the compartment 6h of the differential-pressure washer 6 by a partition 30.

The rapid-closing valve 9 and the rapid-opening valve 15 are so coupled (as represented by the dot-dash line a) that closing of valve 9 immediately opens valve 15 and vice versa. If speed detector 20a senses an excessive speed of the turbine or the pressure-threshold detector 20 connected to controller 11 senses a pressure surge at the blast furnace which is equivalent to a condition incapable of being controlled at the turbine or detrimental to it, the valve operator 20b responds to actuate valves 9 and 15, cutting off the turbine and opening the bypass. The valve 14 is then effective to regulate the backpressure at the blast furnace.

A differential-pressure control circuit 16 is provided to operate, via its control element 24, the fluid-responsive member 6f which controls the rod 6e of the body 6d within the tubular structure 6a of the differential-pressure washer. This tubular structure is provided with a constriction 6c which cooperates with the body 6d to define the annular washing gap. A downwardly diverging nozzle 6g opens into the chamber 6h which communicates with the duct 12.

It is important to note in this embodiment and in distinguishing it from the embodiment of FIG. 2, that the bypass duct 13 communicates downstream of the prewasher 5 with the raw gas line while the bypass line 13 in the embodiment of FIG. 2 communicates with thee mainstream downstream of the differential-pressure washer 6 beyond which the turbine is provided. In both embodiments, however, branching takes place upstream of the turbine.

In either case the differential-pressure washer 6 is disposed in the main duct 12 and is provided with the differential pressure-control circuit 16 which permits the washing to proceed under optimum conditions and is totally independent from the control circuit 10 which regulates the pressure at the head 2 of the blast furnace 1.

As noted, the embodiment of FIG. 1 uses a differential-pressure washer 14 as the pressure-control valve in the bypass duct 13. This has the advantage that in all cases the gases are subjected to differential-pressure washing. Thus, even though the bypass duct 13 communicates with the prewasher 5 ahead of the differential-pressure washer 6, the gases traversing the bypass duct are subjected to differential-pressure washing (in unit 14).

The duct 13 opens into a final filter or droplet separator 17a which communicates with the clean-gas discharge line 17. A duct 8a from the turbine 8, provided with a valve 8b, also opens into the unit 17a.

Upon switchover of the gas flow from the main duct 12 to the bypass duct 13, the wash water sprayed into the differential-pressure washer 6 is of course switched over to the differential-pressure washer 14. In the embodiment of FIG. 2, identical elements have identical reference numerals to those used in FIG. 1 and correspondingly functioning but structurally different elements have the same reference numerls preceded by hundreds digit. Thus, the prewasher 105 is formed with a single partition 129 in which the differential-pressure washer 106 is mounted, the latter having a tubular housing 106a provided with a frustoconical body 106d on a rod 106e which is displaceable by a fluid-powered motor 106f. Since only a single differential-pressure washer is used here, a main duct 50 communicates with the compartment 106h and branches into a bypass conduit 113 provided with a quick-opening valve 115 and a main duct 112 in which the turbine 108 is provided. A quick-closing valve 109 is provided at the intake side of the turbine 108.

Control of the flow through the bypass duct 113, effected in the embodiment of FIG. 1 by the differential-pressure washer 14, is here accomplisged by a pair of control valves 114 in respectve passages 113a and 113b of duct 113, each of these valves being of the butterfly (flap) type operated by the servomotors 127. The duct 112 opens directly into duct 113 beyond a valve 108b so that a common line 117b opens into the mist separator and filter 117a from which the clean-gas line 17 emerges.

As a comparison of the embodiments will show, each of the main and bypass ducts 12, 112 and 13, 113 may be provided with a respective annular-gap washer 6 and 14, respectively. However, a single annular-gap washer 106 can be provided for both ducts 112 and 113, or either of the ducts may be provided with a plurality of such washers connected in parallel.

The expansion turbine unit 7, as seen in FIG. 1, comprises a turbine 8 provided at its intake side with a control valve 18 which is the control element for the control circuit 10.

In this embodiment of FIG. 2, the control valve is eliminated and the control member of circuit 10 is constituted as the adjustable vanes or blades 19. FIG. 3 shows a modification of the system of FIG. 1 in which the control valve 18 is replaced by a louver assembly 31 upstream of the turbine 8 and provided with adjustable blades 32 which constitute the control elements for the circuit 10.

In the embodiments of FIGS. 1 and 3, the pressure-control valve is constituted as a differetial-pressure washer 14 as previously described.

In either case, the rapid-closure valve 9 of the expansion turbine unit 7 and the rapid-opening valve 15 of the bypass duct 13 can be coupled to a controller 20, 20a or 20b as represented in FIG. 1 of the drawing.

The expansion turbine 8 can be an axial turbine or a centripetal turbine with a centrifugal screen housing.

FIGS. 1 and 3 make it clear that the two differential-pressure washers 6 and 14 can be provided in the same washing tower 21 and in this embodiment the rapid-opening valve 15 is provided downstream of the differential-pressure washer 14 associated with the bypass duct 13.

To enable the operation of the system of the present invention to be more readily understood, it should be appreciated that the exhaust gas from the blast furnace is passed either through the main duct 12 or through the bypass duct 13 exclusively. The switchover is effected by simultaneous actuation of the valves 9 and 15 and, in the case of the embodiment of FIG. 2, the valves 109 and 115.

When the gas traverses the main duct 12 or 112, in which it passes through the expansion turbine 8 or 108, a generator 22 is driven and a differential pressure is developed across the differential-pressure washer 6 or 106.

This differential pressure is detected by the differential-pressure controller 23 constituting a main controller for the circuit 16. In the embodiment of FIGS. 1 and 3, the pressure differential is measured between the prewasher 5 and duct 12 ahead of the valve 9 while in the embodiment of FIG. 2 it is measured between the duct 50 and the prewashing tower 105.

The differential-pressure controller 23 can have a set-point input as is conventional and operates with its error signal or output, the servomotor 24 to adjust the position of the body 6d, 106d to maintain a constant pressure differential across the washer.

The residual energy of the gas, after cleaning, is recovered in the expansion turbine 8, 108 and is used to drive the generator 22.

The expansion turbine unit 7 thus fulfills a double function. Firstly, it acts as a control element for the circuit 10 to control the backpressure at the head 2 of the high-pressure blast furnace 1 as described in greater detail below. Secondly, it recovers energy from the exhaust gas.

The control of the back pressure at the blast furnace head 2 is effected by adjusting the positions of the blades or vanes 19 of the turbine 108, the blades 32 of the louver assembly 31 of turbine 8 (FIG. 3) or the valve 18 (FIG. 19) via a servomotor 26 to maintain the back pressure at the blast furnace head 2 constant. Adjustment of the blades 19 or 32 permits the expansion turbine 8, 108 to operate with different characteristics and maintain the desired backpressure with varying volume rates of flow of the gas.

The gas pressure at the head of the blast furnace has, of course, an actual value and a set-point value, these being provided as inputs to the main controller 11 whose error signal is delivered to a position controller 25 which operates the servomotor 26. The setting of the turbine unit 7 is thus varied, when the pressure at the head of the furnace deviates from its set-point value until it is re-established at the set-point value.

The control signal can also be applied to the position controller 27 to operate the motor of the differential-pressure washer as a pressure-control valve. However, since the pressure-control valve will have different characteristics than the turbine for any change in value in the error signal or control signal, a function generator 28 is provided in one of the two control signal lines, preferably in the valve control line, to compensate for the differences in response of the turbine unit and the control valve to ensure full correction of the backpressure.

As noted, the function generator 28 provides position compensation of the closure member 14d or 114 of the pressure-regulating valve in the bypass line (when the valve 15 or 115 is unblocked and the turbine valve 9 or 109 is blocked) for any value of the control signal from the controller 11. The purpose of this compensation is to insure maintenance of the backpressure at the high-pressure blast furnace substantially constant in spite of the tendency thereof to instantaneous fluctuation. When the main duct 12, 112 is blocked and the turbine 8, 108 is used as the backpressure control member, each value of the signal from controller 11 effects a given response of the movable members 18, 19, 31 of the turbine unit to maintain the backpressure constant. Since the positions of members 14d and 114 for a signal of the same value will not necessarily bring about the same response at the pressure control valves of the bypass line, the function generator is necessary to modify this response so that an equivalent compensation for a pressure fluctuation is obtained.

Of course, the function generator can be provided in the input to the control member 26 for the turbine unit if desired with appropriate modification of the transfer function of the unit.

Thus, upon switchover of the flow from the main line 12, 112 to bypass line 13, 113, errors in compensation of the backpressure in the blast furnace can result only when the transfer function of unit 28 does not correspond 100% to the function which relates the positions of the devices 26 and 27 or 127. Such errors can be easily eliminated in practice by the simple expedient of empirically establishing the transfer function so that in all cases the throttling effect in the expansion turbine is equal to the throttling effect at the pressure control valve in the bypass by the master controller 11. The pressure reduction in the pressure-control valve thus corresponds to the pressure reduction obtained by expansion in the turbine unit. The differential washers 6 and 14 (FIGS. 1 and 3) are disposed in a common washing tower 21 and are separated by the partition 29 from the prewasher 5 and from one another by the partition 30.

We claim:

1. A gas-cleaning apparatus for a high-pressure furnace comprising:
   duct means connected to the head of said furnace for conducting an exhaust gas therefrom, the head of said furnace having a back pressure;
   a separator connected to said duct means for separating dust from said exhaust gas;
   a differential-pressure washer having an upstream side connected to said separator and receiving said exhaust gas therefrom;
   a main conduit connected to a downstream side of said washer;
   an expansion turbine unit connected to said main conduit for expanding gas traversing same, said differential-pressure washer being located ahead of said expansion turbine unit and washing gas from said duct means prior to the passage of the gas through said expansion turbine unit;
   a bypass conduit connected to said differential-pressure washer for conducting gas therefrom around said expansion turbine unit;
   a quick-opening valve in said bypass conduit and a quick-closing valve in said main conduit for substantially concurrent operation to switch over flow of gas from said main conduit to said bypass conduit;
   means connected to said quick-opening and quick-closing valves fo simultaneously operating same;
   a pressure-control valve connected to said bypass conduit for regulating flow therethrough; and
   control means connected to the head of said furnace and responsive to the pressure at the head of said furnace and connected to said expansion turbine unit and to said pressure-control valve for operating said unit when said main conduit is traversed by gas and operating said pressure-control valve when said bypass conduit is traversed by gas to maintain said back pressure substantially constant.

2. The apparatus defined in claim 1 wherein said expansion turbine unit comprises an expansion turbine and a guide arrangement for feeding gas into said turbine, said guide arrangement comprising a louver arrangement having a multiplicity of movable blades connected to said control means and operable in response to the pressure at the head of said furnace.

3. The apparatus defined in claim 1 wherein said expansion turbine unit comprises an expansion turbine and a variable cross-section valve ahead of said expansion turbine, said variable cross section valve being connected to said control means for operation in response to the pressure at the head of said blast furnace.

4. The apparatus defined in claim 1 wherein said expansion turbine unit comprises a turbine having adjustable blades, and means for displacing said blades, the means for displacing said blades being connected to said control means for operation in response to the pressure at the head of said furnace.

5. The apparatus defined in claim 1, further comprising a second control means independent of the first-mentioned control means and responsive to the pressure across said differential-pressure washer, said differential pressure washer being formed with a movable body regulating the pressure drop thereacross and operatively connected to said second control means.

6. The apparatus defined in claim 5 wherein said pressure-control valve is a second differential-pressure washer.

7. The apparatus defined in claim 6 wherein at least one of said differential-pressure washers is an annular-gap washer.

8. The apparatus defined in claim 1 wherein said expansion turbine unit comprises a centripetal turbine with a centrifugal screen housing.

9. The apparatus defined in claim 1 wherein the quick-opening valve of said bypass conduit is disposed downstream of said pressure-control valve.

10. The apparatus defined in claim 1 wherein said duct means comprises a duct connected to the head of said blast furnace, said separator is a coarse-particle separator connected to said duct and traversed by the gas from said blast furnace for removing particles therefrom, said apparatus including a prewasher connected to said coarse-particle separator ahead of said differential-pressure washer for initially scrubbing gas from said coarse-particle separator, and a common discharge duct, said conduits opening into said common discharge duct.

11. The apparatus defined in claim 10, further comprising a second control means independent of the first-mentioned control means for measuring the pressure on opposite sides of said differential pressure washer and operatively connected thereto to control said differential pressure washer in response to the pressures on opposite sides thereof.

12. The apparatus defined in claim 11 wherein said first control means includes a control circuit connected to said expansion turbine unit for operating same to maintain said backpressure substantially constant, and another circuit for controlling said pressure-control valve, said other circuit responding to said first circuit, at least one of said circuits being provided with a transfer-function unit for ensuring equivalent pressure drops of said pressure control valve and said expansion turbine unit for a given pressure condition at the head of said blast furnace.

13. The apparatus defined in claim 12 wherein said differential-pressure washer is an annular-gap washer mounted in a common tower with said prewasher.

14. The apparatus defined in claim 13 wherein said bypass conduit communicates with and is in series with said diferential-pressure washer.

15. The apparatus defined in claim 13 wherein said bypass conduit communicates with said prewasher and bypasses said differential-pressure washer.

16. The apparatus defined in claim 15 wherein said pressure-control valve is a further annular-gap washer disposed in said tower, said annular-gap washes being separated from said prewasher and from each other by respective partition means.

17. The apparatus defined in claim 13 wherein said expansion turbine unit comprises an expansion turbine with variable blades integrated in said first control means to regulate said backpressure at said blast furnace.

18. The apparatus defined in claim 13 wherein said expansion turbine unit comprises an expansion turbine and a variable-cross-section valve ahead of said expansion turbine and integrated in said first control means to regulate said backpressure.

19. The apparatus defined in claim 13 wherein said expansion turbine unit comprises an expansion turbine and a variable-position louver arrangement integrated in said first control means to regulate said backpressure.

* * * * *